United States Patent [19]

Seidenfaden

[11] 4,279,554
[45] Jul. 21, 1981

[54] TOOL FOR DEBURRING, CHAMFERING, TRIMMING, AND REMOVING EDGES OF WORKPIECES

[75] Inventor: Heinz Seidenfaden, Varel, Fed. Rep. of Germany

[73] Assignee: Vereinigte Flugtechnische Werke-Fokker GmbH, Bremen, Fed. Rep. of Germany

[21] Appl. No.: 102,037

[22] Filed: Dec. 10, 1979

[30] Foreign Application Priority Data

Dec. 9, 1978 [DE] Fed. Rep. of Germany ....... 2853323

[51] Int. Cl.³ .......................... B23C 1/20; B23B 3/22; B24B 7/00; B23D 67/00
[52] U.S. Cl. .................................. 409/180; 409/181; 29/76 R; 51/102; 82/4 R
[58] Field of Search ................... 82/4 R, 82; 409/175, 409/178, 180, 181, 182, 183; 51/102; 29/76 R, 76 A, 76 B

[56] References Cited

U.S. PATENT DOCUMENTS

| 973,053 | 10/1910 | Langford | 29/76 R X |
|---|---|---|---|
| 2,238,304 | 4/1941 | Belanger | 409/178 |
| 2,255,541 | 9/1941 | Dremel | 409/175 |
| 2,652,863 | 9/1953 | Grabinski | 29/76 R X |
| 2,862,423 | 12/1958 | Warren et al. | 29/76 R X |
| 3,040,631 | 6/1962 | Skantz | 409/181 |
| 3,331,599 | 5/1964 | MacFarlane et al. | 409/180 |
| 3,841,030 | 10/1974 | Laszlo | 51/102 X |
| 3,893,372 | 7/1975 | Strakeljahn | 409/180 |

Primary Examiner—Harrison L. Hinson
Attorney, Agent, or Firm—Smyth, Pavitt, Siegemund & Martella

[57] ABSTRACT

A motor-driven ball cutter is disposed in a guide member held in relation to the rotational drive axis and being suspended for pivoting on an axis traversing the rotational axis in the ball's center due to mounting of the suspension coaxially to the rotational axis by means of a handle. The guide member is provided, for example, with an arcuate, outwardly tapered slot against which bears the work. The cutting depth is adjustable.

6 Claims, 5 Drawing Figures

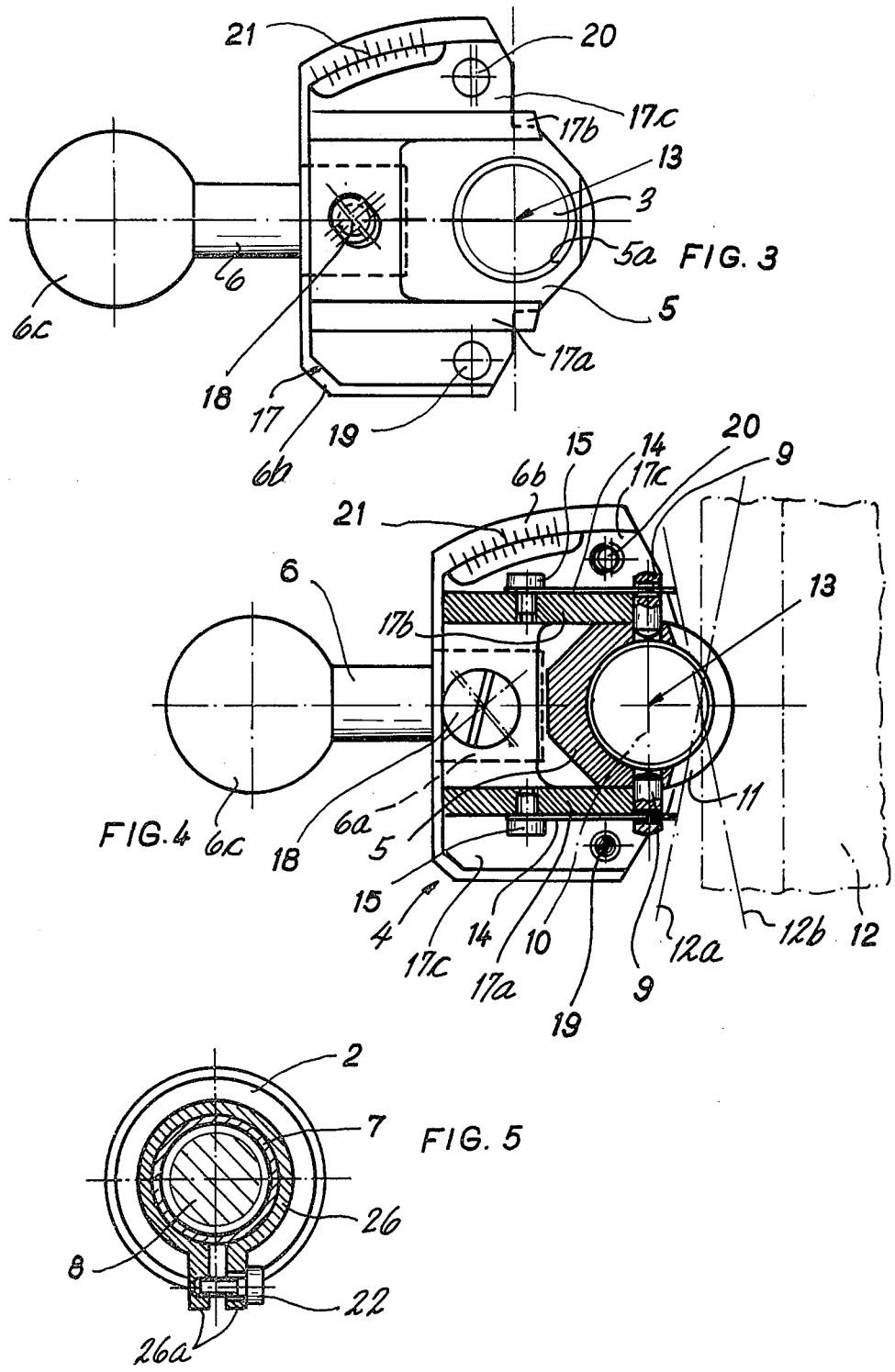

TOOL FOR DEBURRING, CHAMFERING, TRIMMING, AND REMOVING EDGES OF WORKPIECES

BACKGROUND OF THE INVENTION

The present invention relates to a tool or device for deburring, chamfering, trimming, and removing edges or fins, or the like, of work pieces; and more particularly, the invention relates to a tool of this type, being driven by a suitable machine, motor, or the like.

Work pieces, production parts, etc., require occasionally edge trimming, chamfering, deburring, etc., without scoring or producing notches, nicks, flutes, grooves, or other undesirable effects, of cutting too deeply into the work piece. Parts which will later experience a high load must be particularly free from such cuts, nicks, etc., as cracks may more readily begin to form right at such spots, resulting ultimately in failure, e.g., by fracture.

The tools used conventionally (and actually for a very long time) are, for example, files, scrapers, particular blades, etc.; but all of them may, if not handled or guided very accurately, lead to more or less deep cuts. In order to produce, for example, a straight chamfer, one uses particular tools which make sure that the chamfer has exactly the desired contour. The tools themselves may well be manually operated, but maintaining the desired angle requires special skills.

DESCRIPTION OF THE INVENTION

It is an object of the present invention to provide, for purposes outlined above, a new and improved tool which is simple to handle, even by a fairly inexperienced workman.

It is another object of the present invention to provide a new and improved tool for chamfering, or the like, of work pieces along straight edges; but also, along more or less complexly curved edges or work paths.

In accordance with the preferred embodiment of the present invention, it is suggested to provide a bell-shaped or spherical milling cutter being motor-driven for rotation about an axis that traverses the center of the ball. The cutter is, in parts, enclosed by a guide member having slot means for engagement with the work, preferably arcuate, tapered slot means, and being suspended for limited pivoting about an axis which intersects, at least approximately, the rotational axis at right angles and in the center. The arcuate slot establishes an angular work range as between the edge to be trimmed, chamfered, etc., about the rotational axis. The guide member as suspended is preferably adjustable in that the pivot axis can be turned on the rotational axis. The cutting, milling, or chamfering depth is adjustable by additionally permitting adjustment of the guide member as suspended, about a pivot axis which extends parallel to, but is offset from, the rotational axis. On account of this adjustment, the pivot axis of suspension of the guide member may move slightly off the ball center. The suspending element for the guide member is preferably mounted on a handle member which is outfitted with a sleeve for coaxial mounting to the motor housing. This latter mounting provides for the turning adjustment mentioned above. The handle member preferably extends at right angles from the rotational and pivotal axes.

DESCRIPTION OF THE DRAWINGS

While the specification concludes with claims particularly pointing out and distincly claiming the subject matter which is regarded as the invention, it is believed that the invention, the objects, and features of the invention, and further objects, features, and advantages thereof, will be better understood from the following description taken in connection with the accompanying drawings in which:

FIGS. 4 and 5 are section views taken respectively along lines IV—IV and V—V of FIG. 2.

Figure 1:
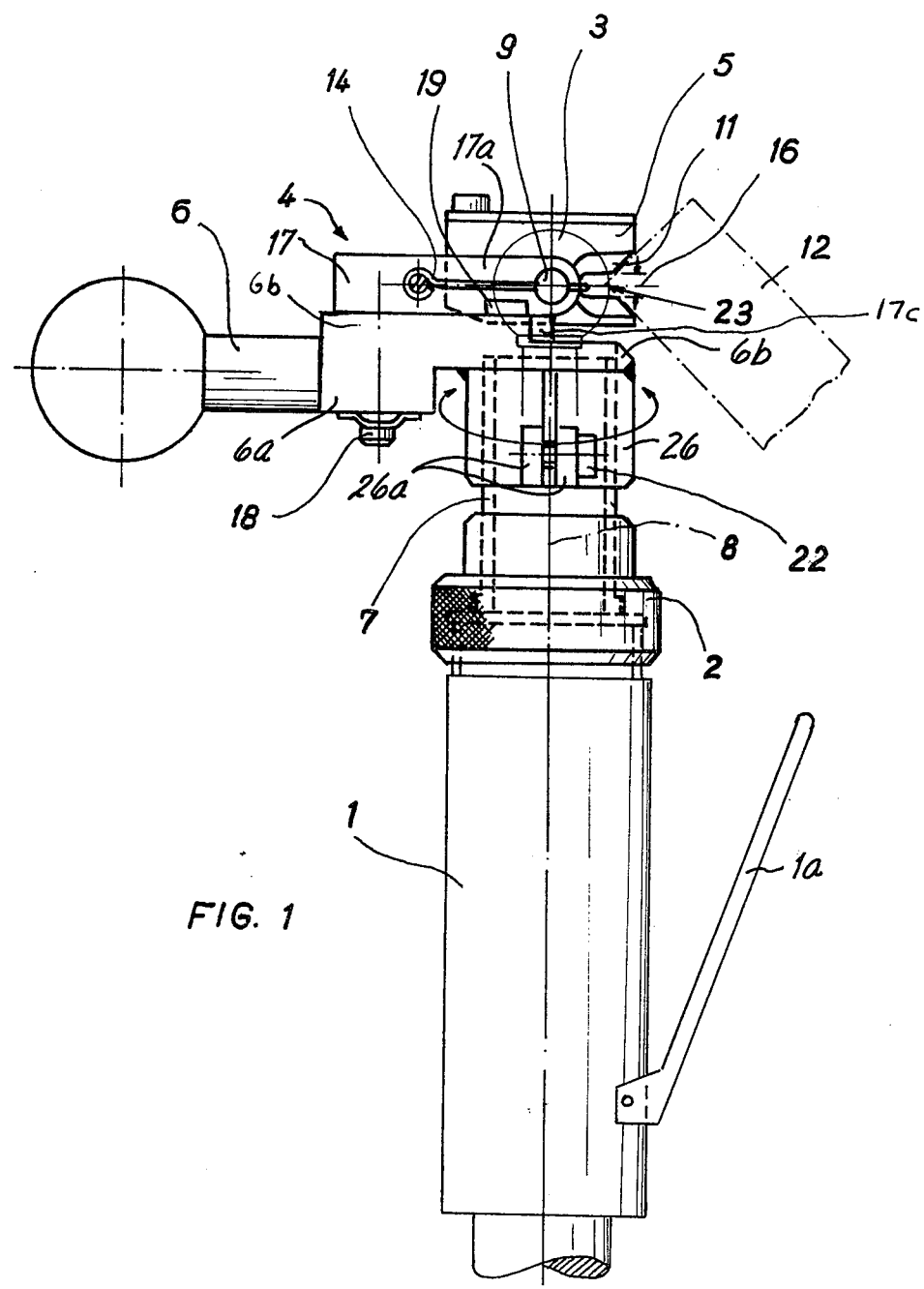
FIG. 1 is a side view of a tool in accordance with the preferred embodiment of the present invention and does constitute the best mode of practicing the same.
Figure 2:
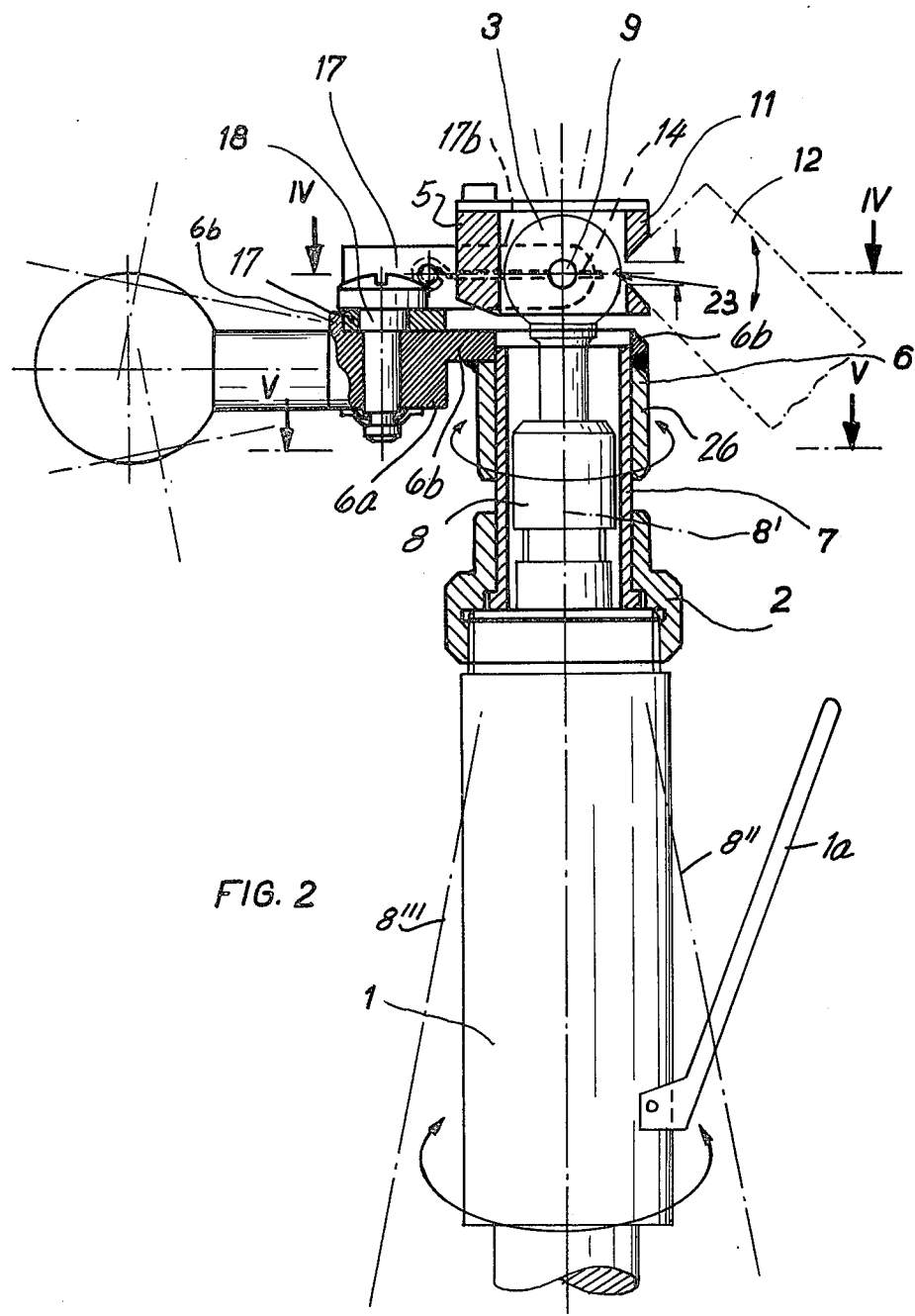
FIG. 2 is a top elevation of the tool as shown in FIGS. 1 and 2.

Proceeding now to the detailed description of the drawings, the figures show a housing 1 for a drive and machine tool motor, which housing is constructed as a handle. A lever 1a is provided for turning the motor on and off. The motor in housing or handle 1 has an output shaft 8, carrying a ball or spherical cutter 3. Shaft 8 has an axis 8', which is the rotational axis of the shaft and of the cutter and traverses the center, 13, of the cutter ball.

The cutter ball, 3, is in parts enclosed (but clears it) by a guide member 5 which, in turn, is part of a head 4. Head 4 includes a mounting member 17, having upright sides 17a and 17b which extend from a platform 17c. The sides, 17a and 17b, hold pins 9 by means of which member 5 is pivoted in member 17; reference numeral 10 refers to the pivot axis. Springs 14 traverse pins 9 for holding them, and the springs are fastened to member 17 (sides 17a and 17b) by means of screws 15. Upon release of the screws, the springs can be retracted, and pins 9 may now easily be removed, e.g., for the purpose of replacing member 5. One can also say that guide 5 is suspended in member 17, which, therefore, could be termed a suspending member.

The mounting and suspending member 17 sits on a block part 6a of a handle and turning member 6. This member 6 has a handle knob 6c proper as well as a member, or extension part, 6b, to which is affixed a split sleeve 26. This sleeve 26 has clamping lugs 26a interconnected by means of a screw 22. This way, sleeve 26 is clamped to a sleeve 7; but upon release of screw 22, one can pivot assembly 6-26 about the axis of of sleeve 7; and one can also adjust the level of handle member 6 along and on the rotational axis 8'. Sleeve 7 is releasably mounted to case 1 my means of a cap screw 2 in coaxial relation to axis 8' of the motorshaft which, as stated, is also the axis of rotation of ball-shaped milling cutter 3. Sleeve 7 protects the rotating shaft and permits mounting of assembly 6-26 in pivotal as well as axial adjustment relative to and about the axis of rotation of the milling cutter.

The mounting and suspending element, 17, is connected and fastened to handle member 6 by means of elements 18, 19, and 20. Element 20 denotes a clamping screw, tying element 17 to member 6; particularly platform 17a is secured to extension 6b. Elements 6 and 17 are pivotable in relation to each other by operation of pivot pin 19. The pivot axis of this mounting extends eccentrically to, i.e., is offset from, the rotational axis 8' of the cutting ball, but does run parallel thereto. The eccentric pin or bolt 18 positions the center portion of mounting member 17 in relation to and on block portion 6a of handle member 6. Adjustment of pin 18 by turning its head pivots or turns mounting member 17 about pin 19; the extent and degree of pivoting can be read from a scale 21. This particular adjustment ultimately also adjusts the relative disposition of guide member 5 to milling cutter ball 3, thereby adjusting the disposition of the latter work point to the work-piece-engaging guide 5.

The one curved side portion of member 5 has a curved, i.e., arcuate, outwardly tapered, or prism-shaped, slot 11 or mouth portion into which one may insert the edge of a work piece 12. One can readily see that guide member 5 must be easily exchangeable for another one for the purpose of adaptation to the contour of the work piece. Presently, a parallelepiped is assumed; and it is further assumed that the one straight edge is to be chamfered. Thus, prism opening 11 has a taper which in any plane that includes axis 8' is 90°. Insertion of a work piece 12, as indicated, establishes a work point 23.

The prism opening or slot taper 11 is, in effect, an arcuate slot on account of the cylindrical contour of member 5 as far as its inside wall 5a is concerned. Accordingly, an angular range is established for the work point, 23, and for the relative angular disposition of the edge of work piece 12 in a plane, transverse to cutter rotation axis 8'. This range is depicted in FIG. 4 (lines 12a and 12b) and amounts to about 35°. Adjustment in this range can be effected either by tilting of the work piece (phantom lines 12a and 12b), and/or its mounting, or by turning handle 6 about axis 8' with or without release of clamp 22. This permits also a certain degree of freedom in the handling of the tool; any inaccuracy in chamfer depth, etc., on account of such a relative tilt of the work piece is of a "higher" order (and even zero, when the arcuate slot 11 is, in fact, precisely concentric to center 13).

FIG. 4 shows also specifically the intersection of the pivot axis, 10, for the suspension of member 5 by means of the pins, 9. This axis 10 intersects axis 8' in center 13 of the ball of cutter 3, at right angles. The handle axis intersects also axis 8' (but in a different level); and handle axis and axis 10, when projected into a common plane, are likewise at right angles to each other.

It can thus be seen that the center of the cutter ball becomes the center about which the various adjustment motions (other than chamfer depth, infra) are carried out; these adjustments refer specifically to the relative disposition of tool and work.

A tilting of the tool as a whole (alternative positions 8" and 8''' of axis 8') remains without effect on account of the suspension of guide member 5, whose tapered work support slot 11 engages the work positively and ensures proper orientation of the work process, as long as the work is held immobile with respect to tilting about an axis parallel to the edge to be chamfered. Either work or tool have to be moved relative to each other; but the suspension of guide 5 for pivoting an axis (10) that traverses rotation axis 8' in the ball's center ensures retention of the desired disposition as between work and cutter head (work point 23).

The arcuate prism slot, 11, is shown to be concentric to ball 3 and axis 8'. However, pivoting of mounting and suspending member 17 (holding guide 5, having slot 11) about pin 19 moves the disposition of prism slot 11 against which work 12 bears, relative to ball 3 and its center 13 and the axis, 8', of rotation thereof. Scale 21 indicates the degree of pivoting which, in turn, is an indication of chamfer depth 16.

The inventive tool offers the advantage that undesired tilting will not occur. The fixed association of the ball cutter to prism slot 11 in guide 5 ensures uniform milling, quite independant from the disposition of the tool as a whole, as long as the guide and its slot 11 properly engage the work, which they will on account of the contour.

The invention is not limited to the embodiments described above; but all changes and modifications thereof, not constituting departures from the spirit and scope of the invention, are intended to be included.

I claim:

1. A machine tool for chamfering, deburring, trimming of edges, or the like, of a work piece, comprising:
   a motor-driven spherical cutter, rotating about a first axis, traversing a center of the cutter;
   a guide member, having a slot and receiving the cutter, the guide member determining the relative position of the work piece; and
   means for mounting the guide member for pivoting about a second axis transversely to the said first axis and at least approximately intersecting the first axis in said center.

2. The tool as in claim 1, including a motor housing, the means for mounting including a handle and sleeve means disposed on the housing coaxial to the first axis, for turning about the first axis.

3. The tool as in claim 1, the guide member having a tapered, arcuate slot whose walls engage the work piece.

4. The tool as in claims 1, 2, or 3, the means for mounting including a suspending member for pins for providing said pivoting of said guide member.

5. The tool as in claim 4, the guide member being removably mounted in the suspending member.

6. The tool as in claim 4, said suspending member being mounted for pivoting on an axis parallel to, and offset from, the first axis.

* * * * *